United States Patent [19]

Howard et al.

[11] 4,162,396

[45] Jul. 24, 1979

[54] TESTING COPY PRODUCTION MACHINES

[75] Inventors: Guy J. Howard, Boulder; Walter C. McCrumb, Berthoud; Paul R. Spivey, Longmont, all of Colo.

[73] Assignee: International Business Machines Corporation, Armonk, N.Y.

[21] Appl. No.: 846,083

[22] Filed: Oct. 27, 1977

[51] Int. Cl.² ............................................. G06F 11/00
[52] U.S. Cl. ...................................... 235/304; 355/14
[58] Field of Search ............................ 235/304, 304.1; 364/200, 900; 355/14

[56] References Cited

U.S. PATENT DOCUMENTS

| | | | |
|---|---|---|---|
| 3,798,614 | 4/1974 | Meadows et al. | 235/304.1 |
| 4,014,609 | 3/1977 | VerSchage | 355/14 |
| 4,058,316 | 11/1977 | Miller | 235/304 |
| 4,062,061 | 12/1977 | Batchelor et al. | 235/304 |
| 4,063,311 | 12/1977 | Jeremiah et al. | 235/304.1 |

Primary Examiner—Charles E. Atkinson
Attorney, Agent, or Firm—Carl M. Wright; Herbert F. Somermeyer

[57] ABSTRACT

Copy machine having provisions for separately addressing and independently exercising individual machine components for maintenance purposes. There are also provisions for addressing sensory components individually and for providing a visual indication of the state of the addressed element so that its proper operation can be verified. In addition to operability indications, the address of the individual machine component being exercised or the sensory component being tested can be displayed.

20 Claims, 15 Drawing Figures

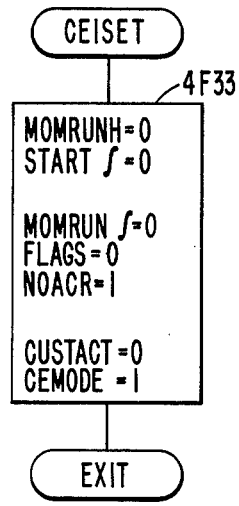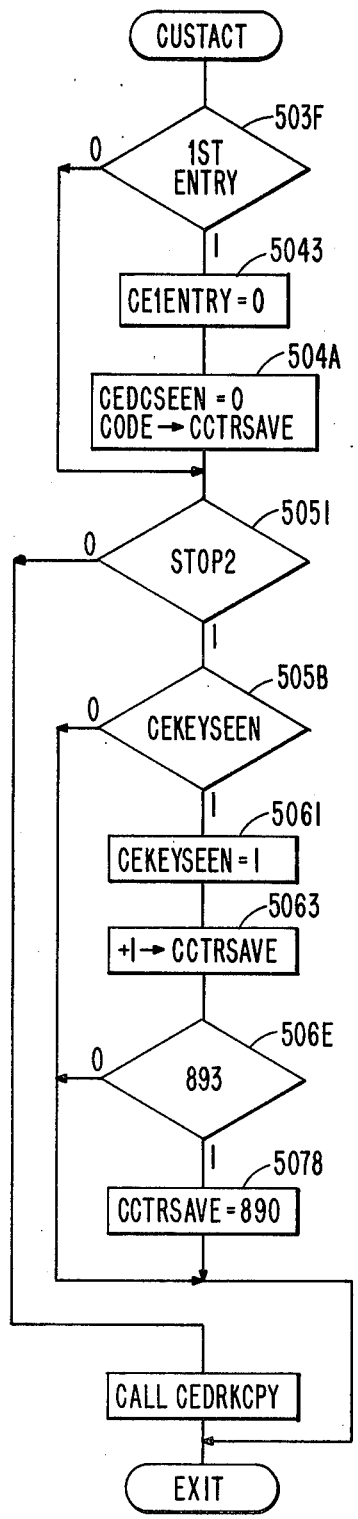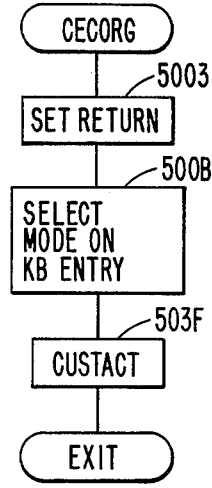

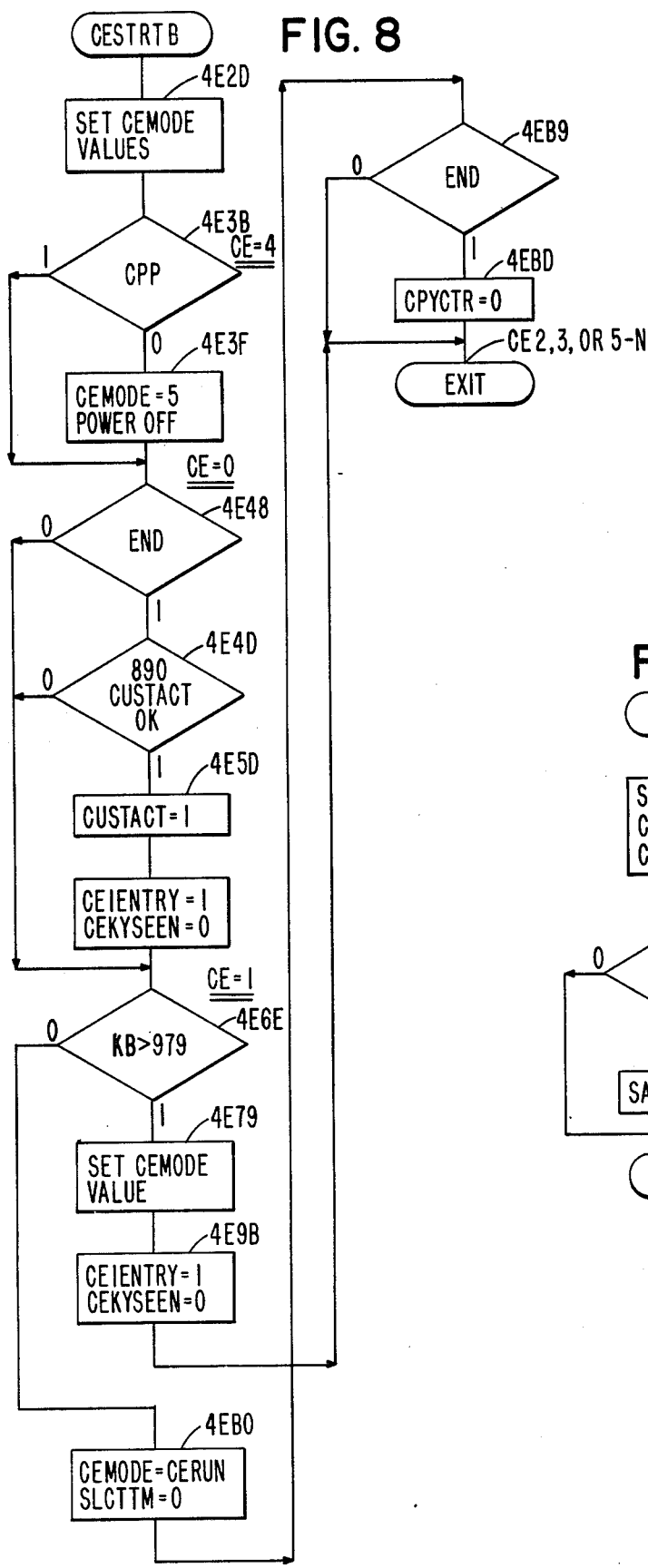

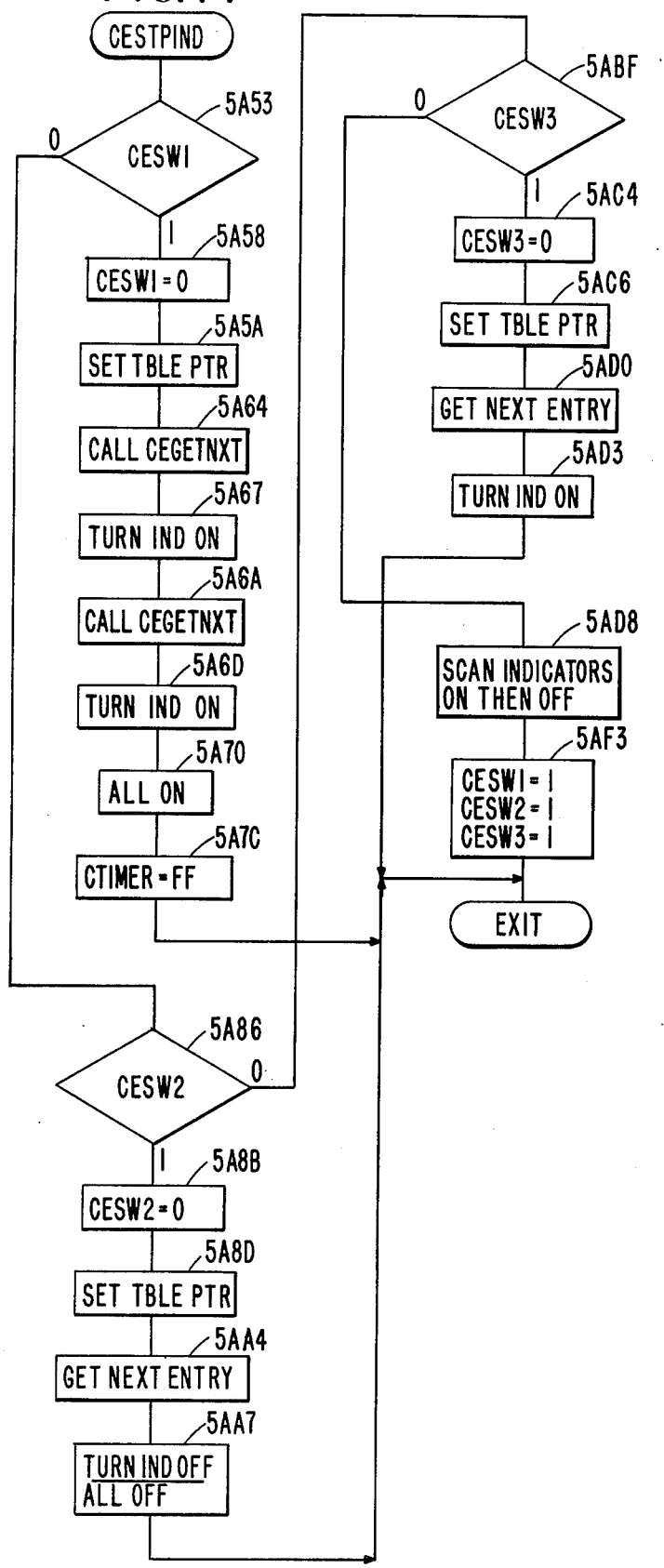

TESTING COPY PRODUCTION MACHINES

DOCUMENTS INCORPORATED BY REFERENCE

Copending, commonly assigned application Ser. No. 729,451, filed Oct. 4, 1976, now U.S. Pat. No. 4,086,658, shows a computerized copy production machine control suitable for use in connection with practicing the present invention.

BACKGROUND

The present invention relates to maintenance procedures for reducing maintenance cost of cyclically operable machines and in particular to copy production machines of the transfer electrographic type or other forms of document reproduction or printing machines.

Copy production machines, particularly the ones of the transfer electrographic type, as well as ink jet and other forms of transfer image recording, usually contain a multiplicity of interacting mechanical, electromechanical, and electrical portions. Error conditions within such a machine can create symptoms which are misleading. Maintenance personnel diagnosing troubles in such machines have to comprehend all of the possible interactions. Analogous procedures have been practiced data processing art for many years. The inclusion of automatic diagnostic programs in computerized control of copy production machines can materially reduce maintenance time by increasing the effectiveness of maintenance personnel as it has in the data processing art. Such diagnostics can operate the entire machine or separately operate major portions of the machine. In general, data processing analysis has resulted in fully automatic diagnostics which are useful in data processing systems of all types including machine control. Portions of the machine or system being controlled can be selectively exercised independently from the rest of the machine for comprehensive diagnostics, or such diagnostics in combination with error status reporting techniques, which are notoriously old, provide a valuable tool for maintaining diverse machines. However, some intermittents and other problems may not be fully diagnosable in a minimal time, even with such full diagnostics. Accordingly, further diagnostic power is yet needed for efficient maintenance of complex machines, particularly of such machines involving electromechanical and electrical circuit interactions.

SUMMARY OF THE INVENTION

It is an object of the present invention to provide a semiautomatic control for assisting in the diagnostics of cyclically operable electromechanical machines, particularly for quickly isolating difficulties with individual components within the machine by providing enhanced interaction between maintenance personnel and the diagnostic and control circuits of the machine being diagnosed.

In accordance with the invention, automatic means within the cyclically operable machine responds to control panel actuations to select a maintenance mode, and in particular, one of a plurality of maintenance modes wherein the operator has close control over selected components of the machine via control panel actuations. In a first of these maintenance modes, the various control members are individually controlled from the control panel. For example, when in this mode the actuation of start button will actuate one of the components in the machine addressed from the control panel, and actuation of the stop button deactuates such addressed components. In a second mode, the control continuously senses a sensory component of the machine. Manual actuation of the sensory component is suitably indicated on the control panel such that the diagnostic personnel can readily ascertain the response of the control to actuation and deactuation of such addressed sensory component. Finally, in a third mode, the indicators in the machine which are essential to successful diagnostics are repetitively checked for indicating to diagnostic personnel that all indicators are suitably actuatable by the machine control. Other major components of the machine are selectively actuated via the control panel for completing the diagnostic procedures.

The foregoing and other objects, features and advantages of the invention will be apparent from the following more particular description of preferred embodiments of the invention, as illustrated in the accompanying drawings.

THE DRAWINGS

FIG. 7 is a flowchart which illustrates an entry into maintenance procedures of the present invention.

FIG. 8 is a flowchart which illustrates procedures in connection with actuation of the start button of the illustrated machine.

FIG. 9 is a flowchart which illustrates entry into certain diagnostic procedures of the present invention.

FIG. 10 is a flowchart which illustrates some data access procedures related to practicing the present invention.

FIG. 14 is a flowchart which illustrates procedures used in connection with stepping through indicators for ensuring all are operative.

FIG. 15 is a flowchart which illustrates a procedure for semiautomatically testing a document feed.

DETAILED DESCRIPTION

Figure 1:
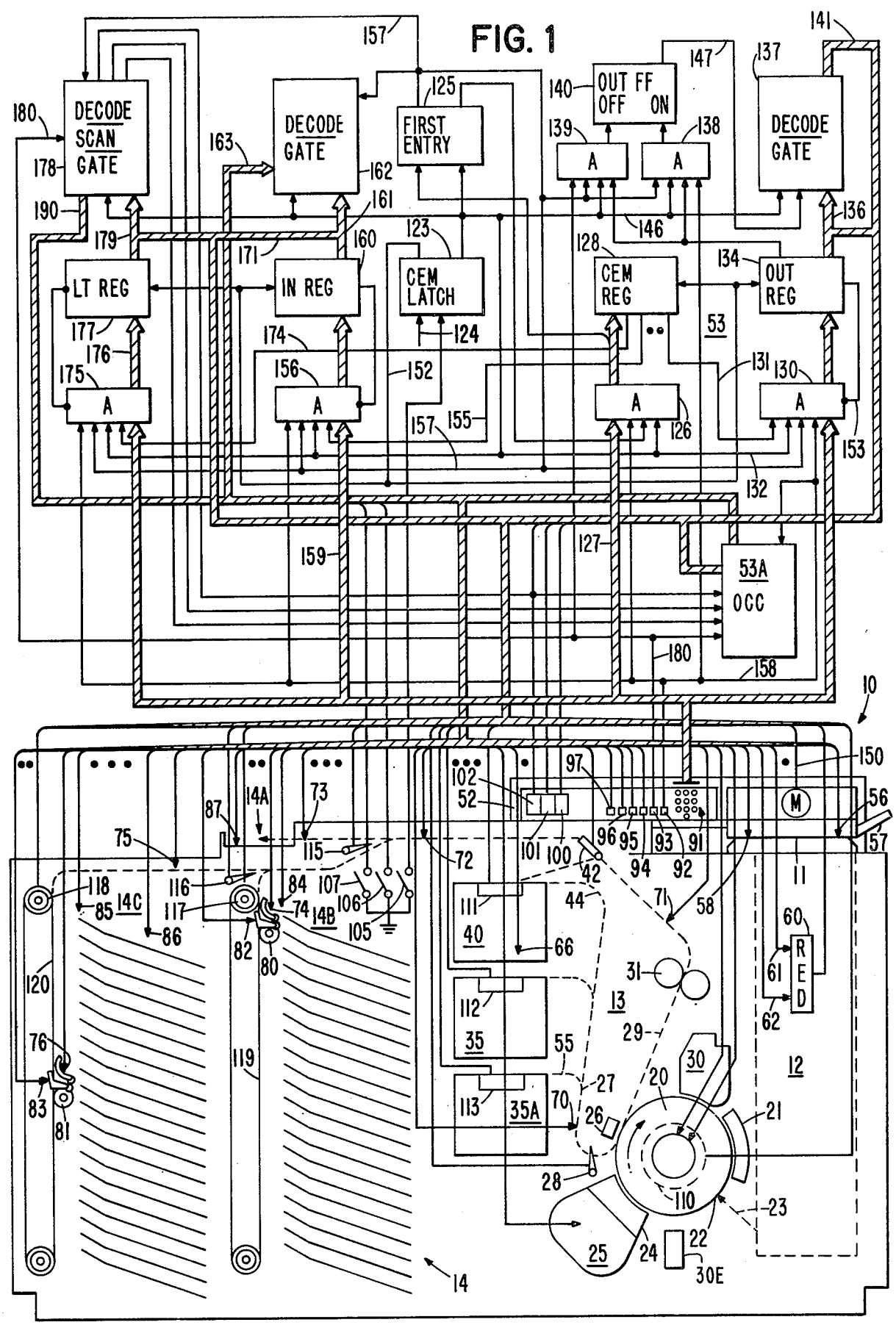
FIG. 1 is a block schematic diagram illustrating certain features of the present invention.

In the drawings, like numerals indicate like parts and structural features in the various diagrams. A copy production machine 10 (FIG. 1), with which the present invention can be advantageously employed, includes a document feed 11 which, in its preferred form, is a semiautomatic document feed. Such a semiautomatic document feed (SADF) 11 includes a lid (not shown) which is raisable for allowing manual insertion onto a platen (not shown) of original documents to be copied. A fully automatic document feed can also be employed. Original input optics 12 scan the original document on the platen for presenting an image to be copied to copy production portion CPP 13. CPP 13 produces a copy and supplies same to output portion 14 which includes a noncollate exit output tray 14A and can include a pair of collator units 14B, 14C.

The copy production machine 10 includes an operator's control panel 52 having a plurality of manually actuable switches for introducing copy production parameters to copy production portion 13. Such parameters are well known and are not detailed except for those parameters arbitrarily having an operative and direct relationship with a constructed embodiment of the present invention.

Before proceeding further with the description of the invention, the operation of copy production portion CPP 13 is described as a constructed embodiment of a so-called xerographic copy production machine 10. Photoconductor drum member 20 rotates in the direction of the arrow past a plurality of xerographic processing stations. The first station 21 deposits either a positive or negative electrostatic charge on the surface of photoconductor member 20. It is preferred that this charge be a uniform electrostatic charge over a uniform photoconductor surface. Such charging is done in the absence of light such that projected optical images, indicated by dash line arrow 23, alter the electrostatic charge on the photoconductor member in preparation for image developing and transferring. The projected optical image from original input optics 12 exposes the photoconductor surface in area 22. Light in the projected image electrically discharges the surface areas of photoconductor member 20 in proportioned to the light intensity. With minimal light reflected from the dark or printed areas of an original document, for example, there is little or no corresponding electrical discharge. As a result, an electrostatic charge remains in those areas of the photoconductive surface of member 20 corresponding to the dark or printed areas of the original document in SADF 11 (semiautomatic document feed). This charge pattern is termed a "latent" image on the photoconductor surface. Interimage erase lamp 30E discharges photoconductor member 20 outside defined image areas.

The next xerographic station is developer 24 which receives toner (ink) from toner supply 25 to be deposited and retained on the photoconductive surface still having an electrical charge. The developer station receives the toner with an electrostatic charge of a polarity opposite from that of the charged areas of the photoconductive surface. As a result, the toner particles adhere electrostatically to the charged areas but do not adhere to the discharged areas. Hence, the photoconductive surface, after leaving station 24, has a toned image corresponding to the dark and light areas of the original document in SADF 11.

Next, the latent image is transferred to copy paper (not shown) at transfer station 26. The paper is brought to the station 26 from an input paper path portion 27 via synchronizing input gate 28. At station 26, the copy paper is brought into contact with the toned image on the photoconductive surface, resulting in a transfer of the toner to the copy paper. After such transfer, the sheet of image bearing copy paper is stripped from the photoconductive surface for transport along path 29. Next, the copy paper has the electrostatically-carried image fused thereon at fusing station 31 for creating a permanent image on the copy paper. The copy sheet then goes to output portion 14.

After the image area on member 20 passes transfer station 26, there remains a certain amount of residual toner on the photoconductive surface. Cleaner station 30 has a rotating cleaning brush (not shown) that removes the residual toner for cleaning the image area in preparation for receiving the next image projected by original input optics 12. The cycle then repeats by charging the just-cleaned image area at charging station 21.

The production of simplex copies or the first side of duplexing copies by CPP 13 includes transferring a blank copy sheet from supply 35, thence to transfer station 26, fuser 31, and, when in the simplex mode, directly to the output copy portion 14.

When in the duplex mode, duplex diversion gate 42 is actuated by control 53 to the downward position for deflecting single-image copies to the interim storage unit 40. Here, the partially produced duplex copies (image on one side only) are stored waiting for the next single-image copy producing run by which the copies receive the second image.

In the next single-image run, initiated by inserting a document into SADF 11 or by lifting the cover and placing original on the platen, the copies are removed one at a time from the interim storage unit 40, transported over path 44, to input path 27 for receiving the second image in the same manner as previously described. The two-image duplex copies are then transferred into output copy portion 14.

CPP 13 has second or alternate copy paper supply 35A which supplies copy sheets to input path 27 via path 55. Selection of paper supply 35 or 54 as the copy paper source is controlled from panel 52 switches. Selection is mutually exclusive. Control circuits 53 respond to panel 52 switches to actuate a paper picker (not shown) in the respective copy paper supplies 35 or 54. The paper picker operation is well known in the art and need not be described in detail for an understanding of the invention.

Figure 5:
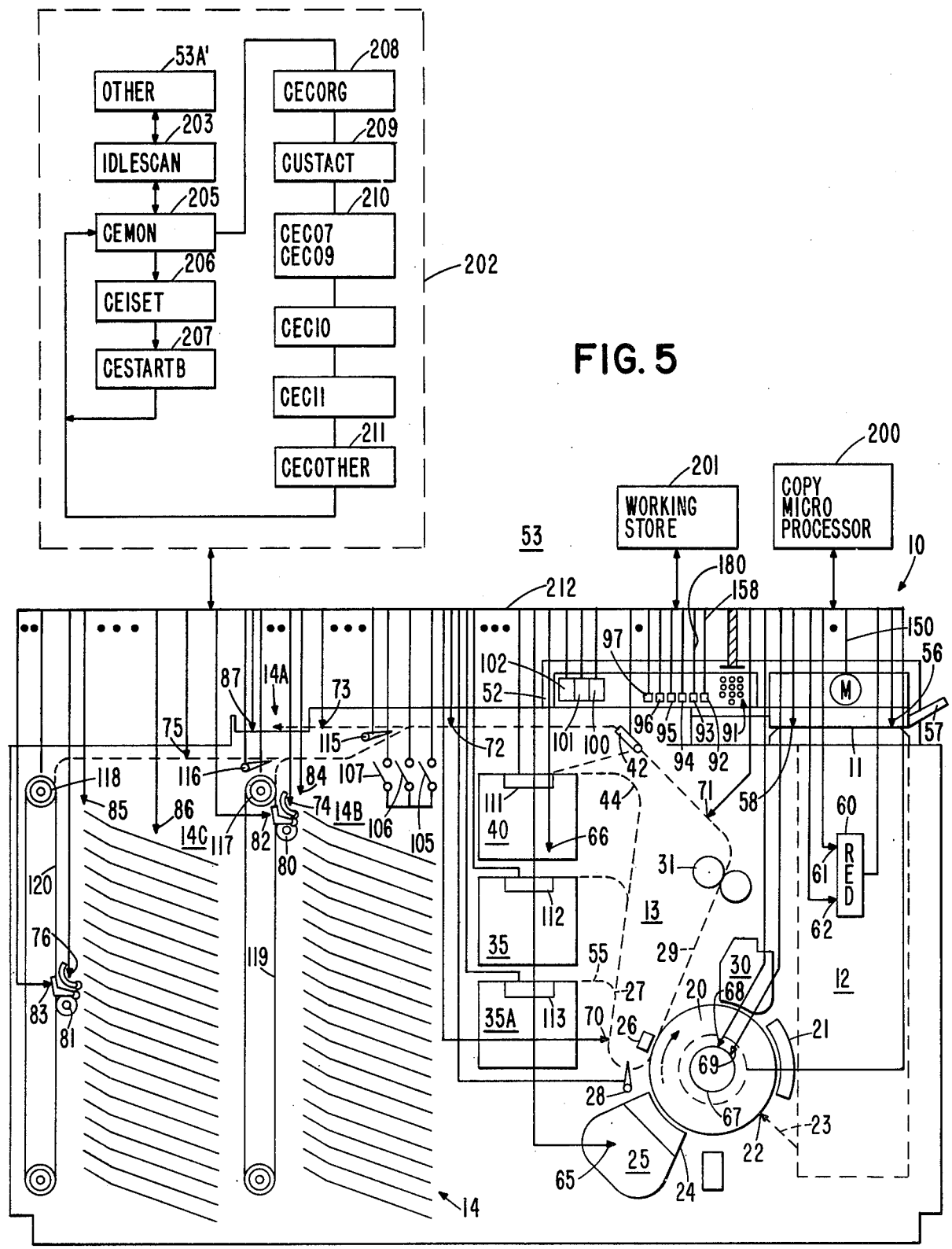
FIG. 5 is a block diagram of a preferred embodiment of the invention employing computerization techniques.

Control panel 52 interacts with control 53 which monitors the operation of copy production machine 10 as well as supplies control signals for effecting copy producing operations. Normal operations of the machine, i.e., usual copy production, is under control of other copier controls OCC 53A. The remaining illustration of control 53 accents that portion of the control pertinent to an understanding of the present invention. As can be seen in FIGS. 1 and 5, copy production machine 10 includes a plurality of sensing points for supplying status signals to control 53. For purposes of brevity, not all of the sensing points are shown. Those sensing points shown are intended to be illustrative of the type of status sensing required by a control 53 for successfully operating copy production machine 10. The examples of the sensing switches include an entry or preentry switch 56 for sensing that a document to be copied that that has been placed in SADF input tray 57. An exit switch 58 senses exiting of original documents from SADF 11. Additional switches may be included in SADF 11 but their descriptions are omitted for brevity.

Original input optics 12 may include several movable parts, and sensing switches may be employed for indicating the position and the successful operation of the movable parts. For example, original input optics 12 may include an optical reduction mechanism 60 which includes means for moving mirrors and lenses to change the image size between the platen of SADF 11 and the image as transmitted over path 23 to photoconductor drum 20. For illustrative purposes, it is assumed that reduction mechanism 60 has first and second reduction modes, respectively, indicated by positions of mechanisms (not shown) as sensed by switches 61 and 62.

As shown in FIG. 5 CPP 13 includes a plurality of parts as previously described and includes many sensing switches for sensing the proper operation of the parts. For example, sensor 65 senses the level of toner in toner supply 25. Sensor 66 senses whether or not copy sheets are in ISU 40. It is understood that supplies 35 and 35A have similar sensing switches for indicating out-of-paper conditions of those supplies. Photoconductor drum 20 includes an emitter wheel 67 for indicating positions of the image areas on the drum with respect to the other portions of CPP 13. Such emitter wheel may include an emit pulse sensor 68 which senses the position of photoconductor drum 20 with respect to portions of image areas, and sensor 69 which senses a pair of reference marks for indicating the beginning of image area assuming two image areas on the drum 20. Using known data processing techniques, the signals from sensors 68 and 69 are used to synchronize the operation of CPP 13 with respect to rotation of photoconductor drum 20 as well as to synchronize all other portions including optics 12 and output portion 14 operation with respect to such drum rotation. Such synchronization can employ such well known data processing timing techniques as used in prior art magnetic drum computers.

An important part of copy production machine 10 is the copy sheet transport path, previously referred to by numerals 44, 27, 29 and indicated in FIGS. 1 and 5 by the dash line with the arrowheads. Because of the possibility of one or more copy sheets jamming, which requires copy production machine 10 to be shut down, the copy sheet paths have a plurality of sensors for indicating the positions of copy sheets along such paths. Only a limited number of sensors have been shown for illustrating the character of sensing employed in the operation of the copy sheet transport path. These sensors are identified by reference numerals 70, 71, 72, 73, 74, 75, and 76. It should be noted that some of the copy sheet path sensors are in output portion 14.

Collators 14B, 14C each include a movable vane type copy distributor 80, 81. Such vanes form a portion of the copy sheet transport path and include sheet sensing vane switches 74, 76. Also, the position of the copy distributors 80, 81 within the respective collators are indicated by sensing switches 82, 83. In an alternate embodiment, switches 82, 83 can be fixed on the frame of the machine to sense a cam that actuates the copy distributors 80, 81 to index between the illustrated collator copy sheet receiving bins. Each of the collators also includes a home sensing switch 84, 85 to indicate when the vanes are in the uppermost or home position. Other miscellaneous sensors not described within the collator are indicated by sensor 86. Noncollate exit tray 14A includes a full tray sensor 87.

In addition to the described sensors, control 53 receives operator parameter selection from control panel 52. Keyboard 91, during usual operations of copy production machine 10, is used to insert the number of copies per original into a copy select register (not shown). In the diagnostic and maintenance mode, utilization of keyboard 91 operation is altered to address various components of copy production machine 10 to be used in connection with the diagnostics as well as to select various modes of diagnostics as will become more apparent. Start button 92 starts operation of copy production machine 10. When a SADF 11 is used, start button 92 is not used to start copy production. A switch (not shown) on SADF 11 used in conjunction with preentry sensor 56 may be used to start copy production machine 10. In the diagnostic mode, start button 92 is used for actuating components as well as enabling the operator to indicate to copy production machine 10 control 53 that certain modes are to be entered.

Stop button 93 during normal usage stops copy production. In a diagnostic mode, it is used for stepping control states of diagnostic control 53 in certain aspects and for deactuating selected or addressed components. Darker copy selection button 94 is used in normal production, as the label suggests, for creating darker copies and in diagnostic modes, it is used in connection with keyboard 91 and operation of control 53.

In addition to the above-described selection buttons, there are additional selection buttons which, when selecting a mode within copy production machine 10, are illuminated for indicating that mode of operation. Included in these are a duplex selection button 95, a reduction mode selection button 96, and a collate selection button 97. Not shown are other indicators on control panel 52 for providing visual communications to the operator in connection with operation of copy production machine 10. Of interest here, however, is a three decimal digit display consisting of a units digit display 100, a tens digit display 101, and a hundreds digit display 102. During normal copy production, displays 100-102 indicate the number of copies to be produced as selected via keyboard 91 as well as the number of copies being produced in a given run as provided by OCC 53A. In a diagnostic mode, three digit display 100-102 is used in diverse manners for providing machine-maintenance personnel communication as will become more apparent.

In addition to the operator input via panel 52, additional switches are provided within the machine 10 to be used in connection with maintenance and copy recovery. These include a so-called CE mode selection switch 105, a misfeed reset switch 106, and a momentary run switch 107. Successive actuations of the CE mode selection switch 105 selects and deselects the maintenance mode. Misfeed reset switch 106 is used in restarting copy production machine 10 after a jam condition. In the diagnostic mode, it is used for other diverse uses in the diagnostic control of copy production machine 10. Momentary run switch 107 is used strictly in the maintenance mode wherein actuation of the switch enables a drive motor (not shown) which turns drum 20 in the direction of the arrow to be momentarily run. Generally in a diagnostic mode, the drum 20 motor is not actuated for safety purposes. In one version of a copy production machine 10, there were two CE mode selection switches 105: one adjacent copy production portion 13 and the other dedicated to collator 14B, 14C. Interaction of the CE mode selection circuits enables selection of the maintenance mode from either of the switches.

Additionally, control 53 supplies command signals to the various components of copy production machine 10 for actuating it in accordance with well known process and machine control techniques. For example, in SADF 11 motor M drives an original document transport belt (not shown) for moving original documents from input tray 57 to the platen (not shown) where original input optics can scan the document for copy production. Motor M drives the belt for both entering and exiting originals from SADF 11. In optics 12, the reduction mechanism 60 is actuated to move between various reduction ratios as is well known in the arts. Reduction mechanism 60 may have its own reduction actuating motor (not shown) or may operate from the main drive motor 110 via a clutch (not shown). Copy production portion 13 is actuated by control 53 actuating motor 110 (FIG. 1) as well as a power supply (not shown) used in operating the various portions previously described with respect to copy production portion 13. Control 53 also actuates copy sheet selectors or pickers 111, 112, 113, respectively, in ISU 40 and copy sheet supplies 35, 35A. Duplex gate 42 is moved between the illustrated upward position for simplex operation or for transporting the second side of a duplex copy and a downward position for directing partially duplex copies to ISU 40 by a solenoid (not shown) actuated by control 53. Similarly, release of input aligner or timing gate 28 is actuated by control 53 as well as the other portions of copy production portion 13 as is well known in the transfer electrographic arts.

In output portion 14, collate-noncollate selection gate 115 is actuated to direct copy sheets to exit tray 14A or to the collators 14B, 14C. Similarly, collate selector gate 116 is actuated via a solenoid (not shown). Also vanes 80, 81 are moved by motors 117, 118 which also drive vacuum transport belts 119, 120 to move copy sheets to the vanes 80, and 81 into the appropriate collator sheet receiving bin.

The maintenance mode is selected by actuating CE mode selection switch 105 to trigger the CEM latch 123 from its reset or nonCE made state to the CE mode indicating state. Normally, via power on reset (POR), CEM latch 123 is initialized to the nonCE mode via by the line 124. When CEM latch 123 is set to the CE mode, first entry latch 125 is also set to indicate that the keyboard 91 entry is the first CE data entry into control 53. With both CEM latch 123 and first entry latch 125 set to the active condition, CE mode selecting AND circuits 126 transfer digits entered from keyboard 91 received over cable 127 to CEM register 128. CEM register 128 includes a decoder for decoding the entered digits to select the diagnostic mode to be used in diagnosing copy production machine 10. Although there are several selectable modes, only three of the modes pertain directly to the practice of the present invention. A first mode is a control 53 output test mode for individually exercising the various controlled elements of copy production machine 10 as previously described. When the first mode has been entered into CEMREG 128, AND circuits 130 are enabled by the decoded selected mode signal on line 131, the CE mode signal received from latch 123 over line 132, and a not first entry signal from latch 125 to pass the digits entered from keyboard 91 to out register (OUTREG) 134. The code contained in OUTREG 134 addresses or selects which of the control devices will be exercised during the output test mode of the invention. Actuation of start button 92 completes the actuation of ANDs 130 for entering the component address to OUTREG 134. When OUTREG 134 has a nonzero content, it inhibits AND circuits 130 from passing more signals from keyboard 91.

Figure 2:
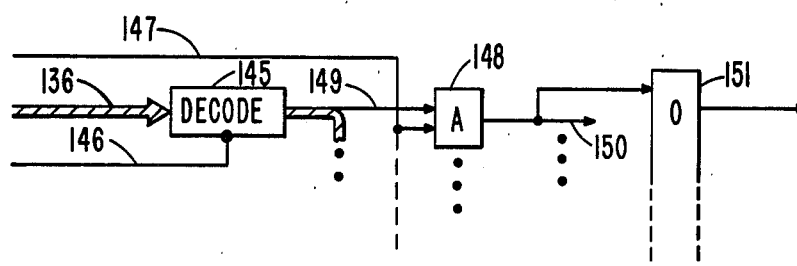
FIG. 2 is a simplified diagram showing the output mode circuits usable with the FIG. 1 illustration.

The component address signals travel over cable 136 to decode and gating circuits 137 which is in FIG. 2.

Also, a nonzero content of OUTREG 134 is decoded for enabling AND circuits 138 and 139 to turn latch 140 on or off for enabling or disabling the addressed controlled component. AND circuit 138 responds to the OUTREG 134 decoded output and the actuation of start button 92 with the CEM latch 123 active signal and the not first entry signal from latch 125 to set OUT flip-flop 140 to the ON condition. This ON condition is supplied to DECODE and GATE circuit 137 for actuating the addressed controlled component. Similarly, AND circuit 139 responds to the stop button 93 being actuated, to the OUTREG 134 decoded signal, to the CEM latch 123 signal, and the not first entry latch 125 signal to reset out flip-flop 140 to deactivate the addressed controlled component.

Decode and GATE circuits 137 supply their control signals over cable 141 to OCC 53A and to the various components mentioned earlier that are controlled by control 53. Also, the digit positions 100 and 101 of the three-digit decimal display of control panel 52 receive the address of the addressed component for indicating to maintenance personnel which component has been selected via keyboard 91. Accordingly, once the component is addressed in the output mode, actuation of start button 92 turns the component on and actuation of stop button 93 turns the component off. In the illustrated embodiment, this is a static control signal, for example, to motor M for turning motor M on and off in SADF 11 or for actuating the solenoid (not shown) of duplex diversion gate 42. The third digit position 102 of the three-digit display receives a signal from DECODE and GATE circuit 137 that indicates whether the controlled addressed component as indicated in digits 100–101 is on or off. A one (1) symbol in digit position 102 indicates the controlled component is actuated while a zero (0) indicates it is deactuated.

In to FIG. 2, an actuation circuit for controlling but one of the many control elements is shown. The cable 136 signals from OUTREG 134 go to decode 145 which is enabled by the CEM latch 123 signal received over line 146. The on/off signal from latch 140 is received over line 147. A set of AND circuits 148, only one of which is illustrated, combine these received signals for supplying actuting signals to the addressed controlled cmponents, respectively. Each AND circuit 148 receives a single decoded output enabling signal over line 149 from decode 145 to pass the on or enable signal received over line 147 to line 150 which is connected to a one of the illustrated components such as motor M of SADF 11. It is to be understood that motor M will have additional control connections from both normal operations as controlled by OCC 53A, and diagnostic controls. The on or off indication for digit display 102 is supplied from AND circuit 148 through an OR circuit 151 to the display 102. Display digit 102 includes a decoder which interprets a relatively positive signal to display a one symbol and a relatively negative signal to display a zero symbol. All of the plurality of AND circuits 148 (not shown in FIG. 2) associated with the described controlled components and shown in FIGS. 1 and 5 are coupled to the single display digit 102.

To change control 53 from the output test mode to another mode, CE button 105 is again actuated which toggles CEM latch 123 to the nonCEM mode, thereby removing the actuating signal on line 146. At this time, an actuating signal is supplied over line 152, resetting OUTREG 134 and CEMREG 128 to all zeros. This action removes the disabling signal from AND gates 130 received over line 153 from OUTREG 134. Because first entry latch 125 has been reset by the output from AND 126 when CEMREG 128 receives the mode indicating signals, control 53 is no longer in the CE mode. Subsequent actuation of CE switch 105 returns latch 123 to the CE mode state, setting first entry latch 125 enabling the next keyboard 91 entry to be entered into the CEMREG 128 by actuation of start button 92.

A second maintenance mode is an input test mode wherein all of the previously described sensors and others not described are checked for their operability by addressing them in the same manner as described for the output mode and then viewing digit 102 to see whether or not their actuation (usually manually by the maintenance personnel) has been detected by control 53. This second mode is indicated by an active signal transmitted by CEMREG 128 over line 155 to second mode initiating AND circuits 156. ANDs 156, constructed similar to ANDs 130, are enabled by the second mode signal on line 155 jointly with the CEM latch 123 signal on line 146, the not first entry signal on line 157, and the start button 92 signal on line 158 to pass the keyboard 92 signals received over cable 159 to in-register (INREG) 160. The nonzero data pattern in INREG 160 disables ANDs 156 in the same manner that the OUTREG 134 signals disabled ANDs 130. The memorized address of the sensor is supplied over cable 161 to decode and gate circuits 162 which are detailed in FIG. 3. The signals from the various sensors are supplied over cable 163 to decode and gate circuits 152. The line 157 not first entry signal also is used to actuate these circuits.

Figure 3:
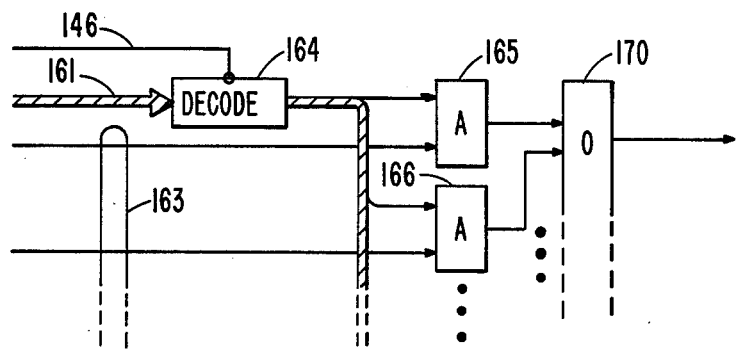
FIG. 3 is a block diagram showing the input circuit arrangement for the FIG. 1 illustrated embodiment.

In FIG. 3, decode and gate circuit 162 includes a decoder 164 responsive to the cable 161 signals for addressing one of the sensory components mentioned above. The output of decode 164, enabled by the CE mode signal on line 146, goes to only one of a plurality of AND circuits 165, 166, and so forth. Since only one AND circuit 165, 166 . . . is enabled, the sensory input lines of cable 163 pass a single signal through the selected one of the AND circuits 165, 166 . . . to pass the sense indication through OR circuit 170 for display in the 102 digit position of the three-digit display. Again, a relatively positive signal, i.e., the sensory component is active, results in a decimal one (1) being displayed, and an inactive sensory component results in a decimal zero (0) being displayed. Digits 100 and 101 indicate the address of the sensory component. The sensory component address signals are supplied directly by INREG 160 over cable 171, thence to digits 100, 101. For example, sensory component 73 may have an address 68. The maintenance personnel then looking at digits 100, 101 exhibiting 68 can actuate sensory component 73. For example, closure of the switch may result in a decimal one (1) in digit position 102, while opening the switch results in a decimal zero (0) in digit position 102.

The second mode is removed from control 53 in the same manner as the first mode. To select the third mode, the entry operations are the same. In the third mode, CEMREG 128 supplies an actuating signal 174 for partially enabling the third mode selection AND circuits 175. These AND circuits respond to the third mode indicating signal on line 174 plus the CE mode latch 123 signal and the not first entry signal to pass the keyboard 91 entered digits when the start button 92 is actuated. AND circuits 175 pass the keyboard 91 signals over cable 176 to LT register 177. A nonzero signal inhibits AND circuits 175 from passing further keyboard 91 entries. In this regard, it should be noted that the address of the components comprises two decimal digits. Accordingly, keyboard 91 may have a two-digit accumulating register (not shown) for transferring the two digits simultaneously through the AND circuits 126, 130, 156 and 175. On the other hand, if a single digit at a time is to be transferred by these AND circuits, then the registers 128, 134, 160 and 177 will not supply their inhibiting signals until both digits have been entered. This type of circuitry is well known and not further described for that reason.

Figure 4:
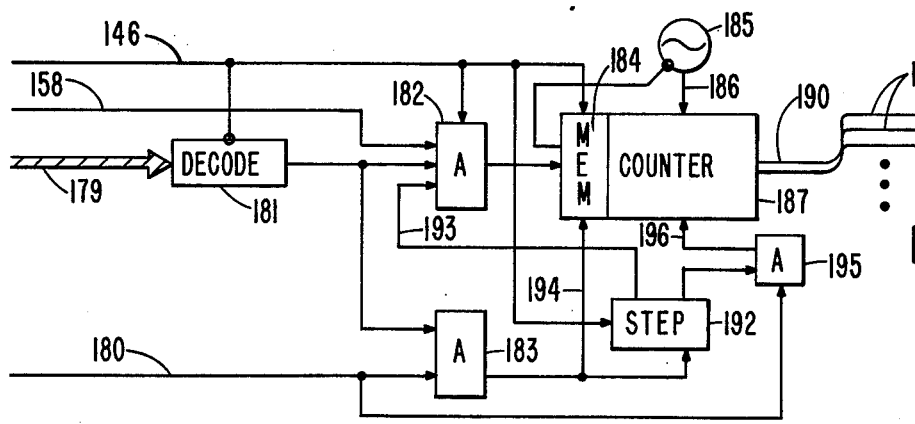
FIG. 4 is an indicator test scan circuit usable with the FIG. 1 illustrated embodiment.

LTREG 177 provides selection signals to decode and scan and gate circuits 178 which are shown and described with respect to FIG. 4.

In FIG. 4, circuits 178 are detailed. LT register 177 output cable 179 not only goes to the digit displays 100, 101 but also goes to decode circuit 181 for indicating to the circuits that a lamp test for panel 52 is to ensue. The CEM latch 123 signal on line 146 enables decode 181 to supply an enabling output signal to controlling AND circuits 182 and 183. Upon actuation of start button 92 after LT register 177 has received the lamp test code, the signal on line 158 passes through controlling AND circuit 182 to set memory bit or flip-flop 184 to the active condition. Both AND circuits 183 and memory flip-flop 184 are enabled by the CEM latch 123 signal. Memory 184 being set to the active condition, enables low frequency source 185 to supply low frequency pulses over line 186 to a controlling counter 187. Such pulses may be at one second intervals. Counter 187 then will count through its modulus continuously for supplying control signals over cable 190 to all of the indicators on panel 52, one line 191 for each of the indicators. When 187 is in a reference or all-zeros state, all lines 191 are simultaneously enabled for lighting all indicators on panel 52 simultaneously. Then, as the counter steps to binary 1, only one of the lamps is illuminated, such as the duplex lamp. Then, as counter 187 steps through its count modulus, successive lines 191 receive enabling signals for scanning all of the lamps or indicators on panel 52. When counter 187 reaches its maximum value, the all-zeros state is again entered for illuminating all of the lamps. This mode of operation is called the automatic scan mode.

The maintenance personnel may desire to step the panel lamps at a slower rate. To do so, the stop button 93 is actuated to supply a control signal over line 180 through controlling AND circuit 183 to set step latch 192 to the active condition. Actuating step latch 192 also disables AND circuit 182 via a disabling signal supplied over line 193. Also, the output signal from AND 183 goes over line 194 to reset memory latch 184, thereby disabling pulse source 185 from supplying pulses over line 186. This action terminates the automatic scan mode. The scans stop exactly at the place in the scan where stop button 93 was actuated. Subsequent actuations of stop button 93 supply pulses to AND circuit 195. AND circuit 195, being enabled by step latch 192 supplies an incrementing pulse over line 196 to counter 187. Accordingly, it is seen that as incrementing pulses go to counter 187, the scan is manually stepped from one position to the next whereby all or any selected one of the lamps being tested are illuminated. Actuating the start the button will again supply automatic pulses and start automatic scan mode. Exit from the lamp test mode is accomplished by actuating CE button 105 again which resets CEM latch 123. This action removes the enabling signal from line 146 which resets step latch 192 and resets memory 184. As shown, the test can only include the automatic scan method or the step method as selected by the maintenance personnel.

To change the address of a controlled or sensory component, the test mode is reselected. Actuation of another switch on panel 52 can restore the control 53 to the CE first entry state for accepting a new address without mode reselection. In this case, CEMREG 128 and the associated address register 134,160 are cleared to zeros.

FIG. 5 illustrates a preferred embodiment of the present invention wherein the control circuits of control 53 rather than being embodied in the hardware circuits as shown in FIG. 1 are embodied in a computer control system which includes a copy microprocessor 200 which can be any microprocessor and programmed in accordance with the teachings of Samir S. Husson in MICROPROGRAMMING PRINCIPLES AND PRACTICES, Prentice Hall Inc. (Englewood Cliffs, N.J.) 1970, Library of Congress Catalog Card No. 72-122612, as well as other programming texts and as taught in the literature in many diverse periodicals. Working store 201 is a random access memory of the semiconductive type which is used to store various control flags, indicator bits, and the like as will become apparent. The control of the machine 10 is resident in a read only store 202 which is preferably of the semiconductive type and is constructed to include indicia of programs which copy microprocessor 200 responds to for monitoring and controlling of the operation of copy production machine 10. In general, copy microprocessor 200 operates with copy production machine 10 using known process control and machine control techniques as represented by the resident program 53A' entitled "OTHER" of ROS 202. Such programs are invoked using a well known idle scan procedure 203 which also invokes copy microprocessor 200 to execute the procedures used in connection with practicing the present invention with respect to the illustrated copy production machine 10, i.e., the maintenance procedures for the copy production machine which are embedded in semiautomatic and automatic diagnostics.

The diagnostic procedures are included by a CE monitor procedure (CEMON) 205 which is a supervisory procedure for controlling the operation of copy production machine 10 in the maintenance mode. From CEMON 205 the initial actuation of CE button 105 is analyzed by copy microprocessor 200 in procedures CE1SET 206. Analysis of actuation of the start button 92 is by copy microprocessor 200 in procedures CESTARTB 207.

The maintenance procedures which include the procedures of the present invention are invoked by copy microprocessor 200 via CEMON 205 beginning at CECORG 208 which sets up the organization of the maintenance procedures. Then a nonmaintenance operator may be involved in the procedures at CUSTACT 209 in a limited sense. Following these procedures, copy microprocessor 200 then goes into the details of the maintenance procedures at 210 which represents a series of procedures labeled CEC07 through CEC09 and not further described because they are not pertinent to the present invention. Next, at CEC10 the lamp test mode described with respect to circuits 178 of FIG. 1 is performed. Then, at CEC11 the input and output procedures described with respect to FIG. 1 circuits 137 and 162 are performed. Then other maintenance procedures at 211 may be performed. In this regard, it will be remembered that keyboard 91 was actuated by the maintenance personnel to key in a code for selecting which of the modes are to be performed. That is, if the lamp test mode CEC10 is to be performed, a corresponding code is inserted and only that mode is performed even though a copy microprocessor 200 may scan to see selection has been entered by the maintenance personnel through keyboard 91. Return to the idle scan 203 is via CEMON 205.

The interconnections between control 53 computerized version of FIG. 5 and all of the elements of copy production machine 10 as described with respect to FIG. 1 are the same but are made via a single input/output data transfer bus 212 via input and output staticizing registers (not shown) operatively connected to bus 212 and addressable by copy microprocessor 200 in the manner disclosed by David E. Findlay in commonly assigned, copending application Ser. No. 729,451, filed Oct. 4, 1976 now U.S. Pat. No. 4,086,658. The address bus extending from copy microprocessor 200 to working store 201, ROS 202, and the various not shown) input/output registers are also omitted for brevity, it being understood that the construction shown in said Findlay application can be advantageously employed in the FIG. 5 illustrated embodiment. All of the elements shown in copy production machine 10 outside of control 53 are identical to those shown in FIG. 1.

Figure 6:
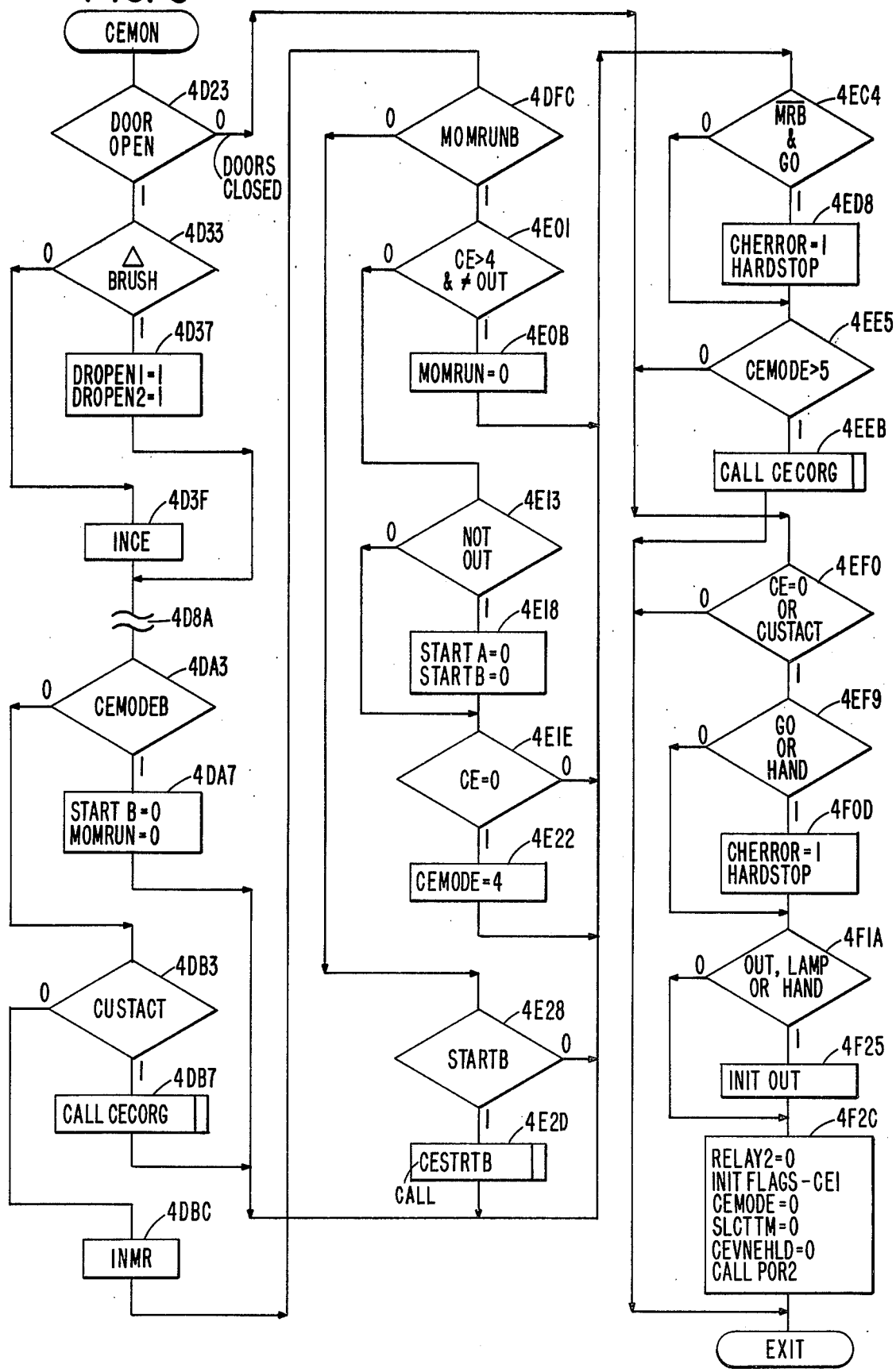
FIG. 6 is a flowchart which illustrates maintenance scanning procedures of the present invention.

CEMON 205 is shown in FIG. 6. These procedures first check at 4D23 to see whether or not the doors to copy production machine 10 are open. Such doors (not shown) actuate interlock switches (not shown) for indicating whether or not the doors are open. If the doors are open, then the operation of copy production machine 10 is usually inhibited and it is interpreted by control 53 that either the CE mode or some other procedure outside of normal copy production is to be employed. If the doors are closed, then copy microprocessor 200 proceeds immediately to step 4EF0, later described. With the doors open, copy microprocessor 200 checks at 4D33 to see whether or not a cleaning brush within cleaning station 30 is being advanced toward photoconductor drum 20. Such advance is suitably described in U.S. Pat. No. 3,989,372 to Ron Davidge et al. If the brush is being advanced, then the door open flags DROPEN1 and DROPEN2 are both set to one. These bits are addressable bits within working store 201 and not shown for simplifying the drawing. Such bits are addressable by copy microprocessor 200 in the same manner that any bit position within a random access memory can be accessed. If the cleaning brush of station 30 is not being advanced, then the CE button 105 actuation is checked by an integration procedure 4D3F. Some other steps not pertinent to the present invention are performed at 4D8A. The integration of the CE switch 105 at 4D3F will result in setting a flag for a bit position of working store 201 indicating successful integrating of the CE switch. This flag is checked at 4DA3. If it was actuated, then, in a second flag in working store 201, STARTB is reset as well as MOMRUN which corresponds to momentary run switch 107. From 4DA7, copy microprocessor 200 goes to 4EC4 as later described. If the CE switch 105 was not actuated, then at 4DB3 copy microprocessor 200 checks to see whether or not CUSTACT is active, i.e., nonmaintenance personnel are operating with control 53 for performing predetermined functions. If so, then at 4DB7, CECORG 208 is called and executed as later described.

If CUSTACT is zero, then momentary run switch 107 actuation is checked at 4DBC. Such checking is by digital integration. Then the success of integration (time of closure is integrated) is checked at 4DFC by checking flag MOMRUNB which, when set to the active condition, signifies that switch 107 had been actuated previously but was no longer. Then the start button is checked at 4E28. The operation of the start button 92 is the same as described for FIG. 1. If it were selected, then a CESTRTB routine is executed beginning at 4E2D. (The CESTRTB subroutine is detailed in FIG. 8.) Such flag is a bit position in working store 201.

On the other hand, if MOMRUNB equals one, then copy microprocessor 200 at 4E01 checks to see what value is inserted into working store 201 via keyboard 91. Such indication would include checking whether or not a CE mode greater than four, i.e., as indicated in steps 210 in ROS 202, and whether the output mode (CEC11), as described with respect to circuit 137, has not been selected. If both those conditions are true, then MOMRUN is set to a zero at 4E0B; otherwise, the output mode of CEC11 is checked at 4E13. If the output mode is selected then the STARTA and STARTB flags are reset at 4E18. Otherwise, copy microprocessor 200 goes directly to step 4E1E to check whether or not the CE mode is active. With CE equal to zero, it is not in the CE mode and the step at 4EC4, later described, is performed. Otherwise, at 4E22 the copy microprocessor sets the CE mode indicator to four which is a reference number useful in the maintenance mode and not pertinent to the present invention.

At 4EC4 copy microprocessor 200 checks to see whether or not copy production machine 10 is in a "go" or enable to be started state and that the momentary run button 107 has not been actuated. If these two conditions are satisfied, copy production machine 10 must be stopped immediately at step 4ED8 as indicated by "HARDSTOP" and an error condition flag is set in working store 201. If such conditions are not met, then copy microprocessor 200 goes directly to 4EE5 to check whether or not the CE mode selected via keyboard 91 is greater than five. If it is, then CECORG 208 is called and executed as later described. If not, then at 4EF0 the copy microprocessor 200 checks whether the CE mode is inactive (CE=0) or CUSTACT is active. If either condition is true, then at 4EF9 copy microprocessor 200 checks whether or not copy production machine is to go. If so, the error flag referred to above is set and the hardstop of copy production machine 10 is executed at 4F0D. Then, at 4F1A, the CE mode's output corresponding to circuits 137, lamp test mode corresponding to circuits 178, or a so-called hand crank mode is active. If any of these are active, then all of the output registers (not shown) of control 53 are initialized to the reference state, preferably all zeros, at step 4F25. Finally, the last procedure of FIG. 6 is at 4F2C wherein the power relay number two is deactivated for protection of the maintenance personnel, initializing flags for CE1 mode, i.e., the first actuation of CE switch 105, are set. The CE mode is set to zero, i.e., the numerical input to keyboard 91 has not yet been interpreted by control 53, and SLCTTM is set to zero. This latter flag is in working store 201 and causes copy microprocessor 200 to ignore copy parameter selections made via control panel 52. The vane held flag is reset for enabling copy microprocessor 200 to actuate the vanes 81 and 80 to move in collectors 14B, 14C. Finally, a power on reset procedure POR2 is then executed. That procedure initializes copy production machine 10 under control of copy microprocessor 200 and is not pertinent to the practice of the present invention. It should be noted that steps 4EF0 through 4F2C are executed only if the doors are closed as detected by copy microprocessor 200 at 4D23, and hence are not performed in the CE mode but are performed when the maintenance personnel have closed the doors after doing maintenance procedures, for example, for enabling copy microprocessor 200 to effect starting of copy production machine 10 when all of the controls of copy production maching 10 have been initialized to a startable condition.

FIG. 7 illustrates the procedures followed by copy microprocessor 200 upon the first actuation of CE switch 105. CE1SET procedures 206 are relatively simple in that several flags in working store 201 are merely reset. This includes the momentary run indicator for switch 107, a start integrator for the start button 92, momentary run switch 107 integration routine flag, and many other flags are reset to zero. NOACR is set to one because no copy recovery will be permitted in the CE mode. CUSTACT is zero because actuation of the CE button 105 indicates to control 53 that maintenance personnal are operating the copy production machine 10 rather than a nonmaintenance operator. Finally, a flag CEMODE is set to one for indicating to copy microprocessor 200, in later described procedures, that, in fact, copy production machine 10 is in the maintenance mode as signified by the maintenance personnel actuation of CE button 105.

FIG. 9 illustrates the procedures of CECORG 208. This set of procedures is executed by copy microprocessor 200 only on call from other procedures such that a return is set at 5003. The keyboard 91 entry is interpreted at 500B and the CE mode chosen by the maintenance personnal via keyboard 91 is selected. CUSTACT is executed as indicated at 503F and as detailed with respect to FIG. 10. Execution of CUSTACT procedures by copy microprocessor 200 has certain ramifications to maintenance procedures and is described for that reason.

FIG. 10 illustrates the CUSTACT procedures. The first entry, i.e., the first actuation of CE switch 105, is checked at 503F. The first entry is represented by CEM latch 123 of FIG. 1 being toggled to the active condition. A bit condition within working store 201 stores this same information. If it is the first entry, then at 5043 the CE1ENTRY flag is reset to zero, and at 504A, the CEDCSEEN flag is also reset to zero. The above two steps indicate that actuation of the CE button 105 was the second one, i.e, the first entry step at 503F indicated switch 105 had previously been actuated.

Then, at 5051, a STOP2 flag of working store 201 is checked. If it is active, stop button 93 had been actuated and accepted by control 53. Then, at 505B, the CEKEYSEEN flag is checked to see whether or not switch 105 had previously been logged as actuated. If not, then the flag is set to one at 5061. At 5063, one is added to the CCTRSAVE field of working store 201. This means that the actuation of the stop button increments the count field in CCTRSAVE. Then, at 506E, the value 893 is checked to see whether or not it has been received from keyboard 91. If so, then CCTRSAVE is set to value 890 at 5078. That is, 890 is the lowest value used in CUSTACT. Each time the stop button 93 is actuated, CCTRSAVE is incremented until the value 893 is reached at which time it is reset to the initial condition value 890. If the stop button had not been actuated at 5051, the CEDRKCPY routine is called for determining whether or not dark copy button (not shown) was actuated. Such button is used in connection with maintenance procedures not pertinent to the practice of the present invention.

Figure 11:
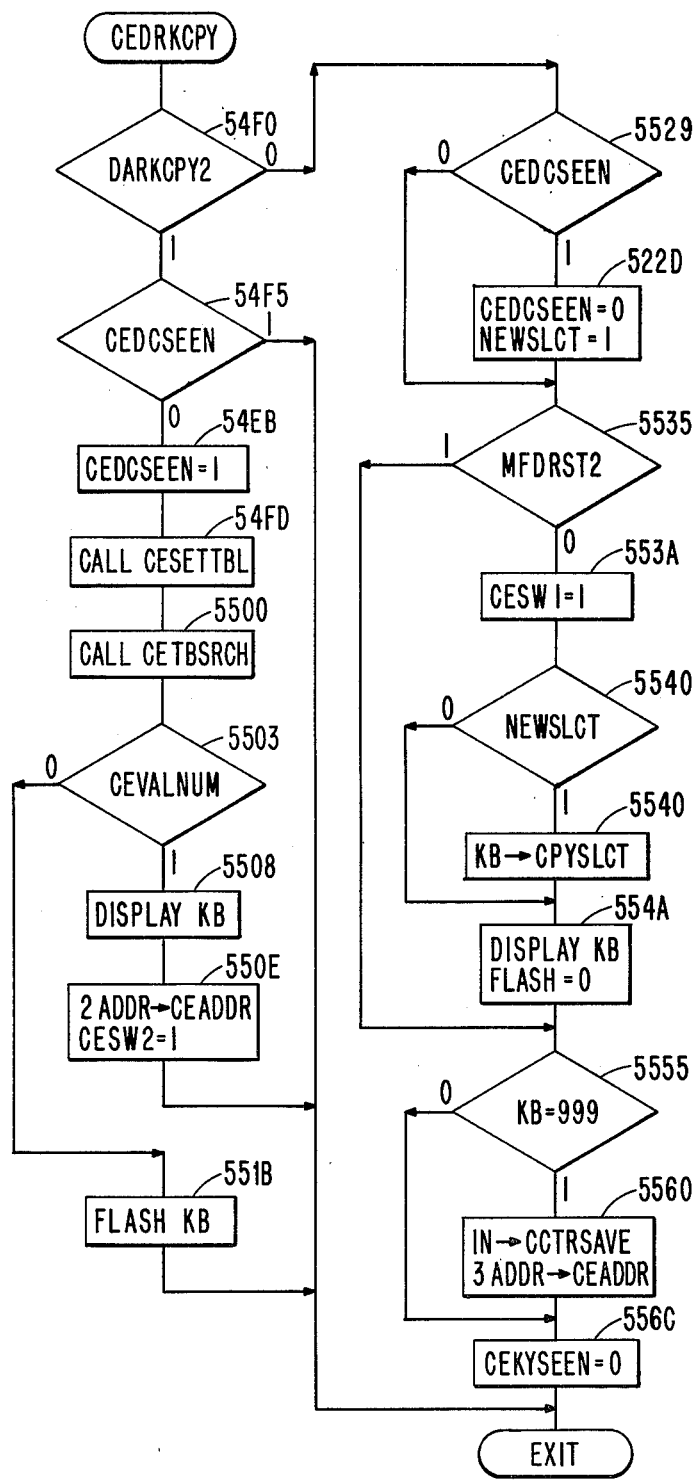
FIG. 11 is a flowchart which illustrates procedures with respect to actuation of a so-called dark copy button on the control panel.

FIG. 11 shows the CEDARKCPY procedures wherein at 54F0, the copy microprocessor 200 checks to see whether or not the switch has been actuated. If it was actuated, then the actuation of CE switch 105 is checked at 54F5. If both had been actuated, the procedure is terminated. If only the dark copy button had been actuated, then at 54EB the flag CEDCSEEN is set. Then a log related procedure is invoked at 54FD and 5500 relating to acquiring diagnostic information not pertinent to practicing the present invention. Then, at 5503, the validity of the diagnostic information is checked. If it is valid and the keyboard entry is also valid, the value entered into keyboard 91 is displayed in digits 100, 101, 102 at 5508. Then, at 550E, further controls are actuated. If the number entered into the system by keyboard 91 is not valid, then the entered number is flashed at 551B.

If dark copy had not been actuated, then, at 5529, the CEDCSEEN flag is checked. If it is active, the flag is reset to zero and a NEWSLCT flag is set indicating a new operator parameter selection is expected. Then, at 5535, the actuation of misfeed reset switch 106 is checked. If it was not actuated, then the flag CESW1 is set to one at 553A. Also, NEWSLCT flag is checked at 5540. If it is one then the new selection has been made via keyboard 91 and the value of keyboard 91 is transferred to the CPYSLCT register (not shown) in working store 201. The value is displayed in digits 100, 101, 102 without flashing.

At 5555, the value of the keyboard entry is checked against 999 which is a reference or reset entry. If the keyboard entry is 999, then the keyboard number is supplied to CCTRSAVE register of working store 201. In any event, at 556C CEKYSEEN flag is reset.

Figure 12:
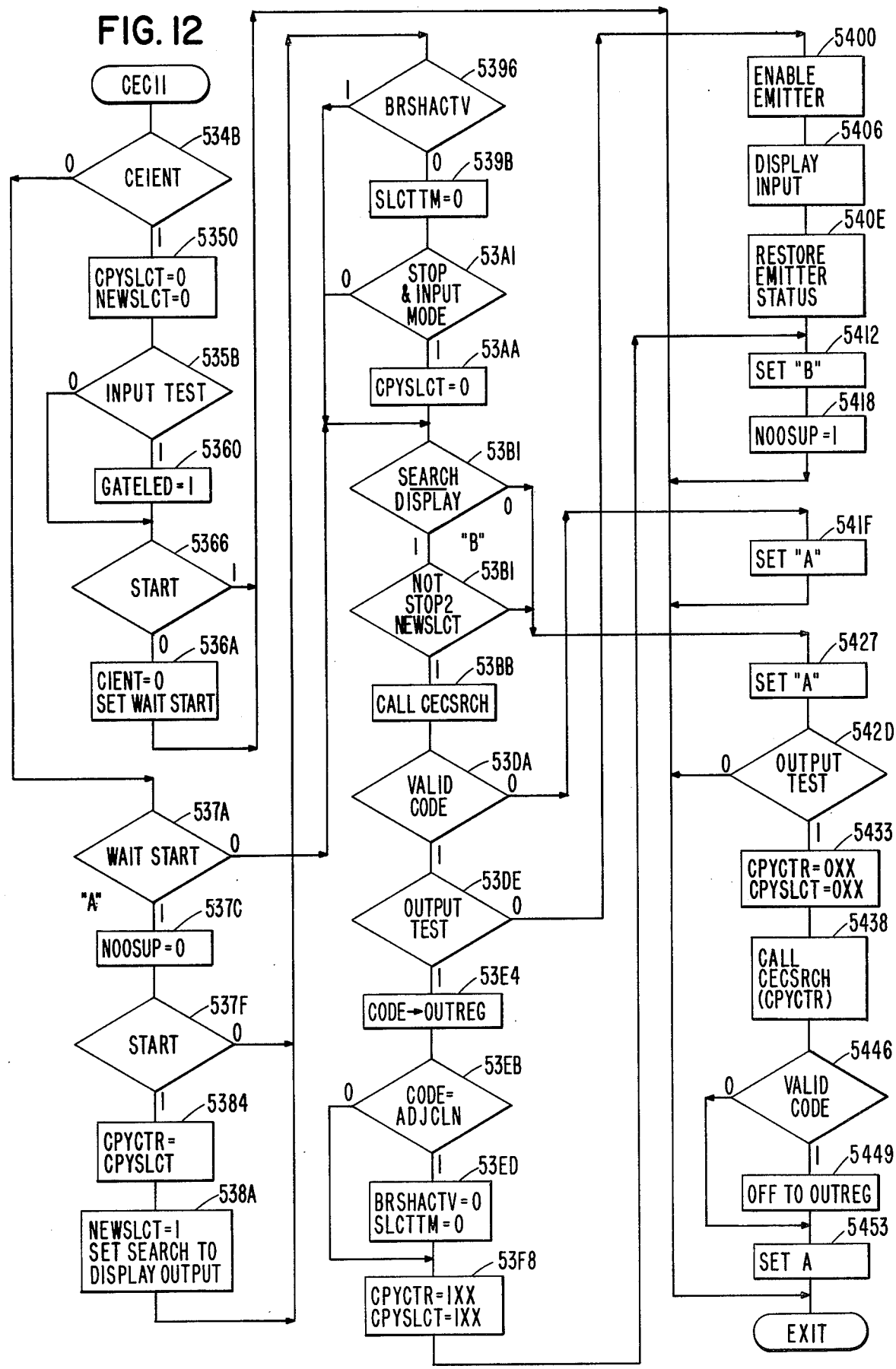
FIG. 12 is a flowchart which illustrates procedures of the input output test mode of the invention.

Before describing the lamp test of CEC10, the input/output mode procedures are described with respect to FIG. 12 using the CEC11 procedures. First, at 534B, the CE1CNT flag is checked. If active, then at 5350 the registers CPYSLCT and NEWSLCT are reset to zeros. At 535B, copy microprocessor 200 checks to see whether or not it is an input test for the copy production machine 10. It will be remembered that the input test is indicated by the operator inserting a predetermined code into keyboard 91. If an output code is used, the output mode is selected. If the mode is selected, then at 5360, the flag GATELED is set to one for enabling the display 102 to display the sensed value (1 or 0) and display the source of the sense value in code in digits 100 and 101.

The start button 92 is sensed at 5366. If it was actuated, the CEC11 procedures are omitted. If the start button 92 was not actuated, then the flag in working store 201 entitled CE1ENT is reset and another flag WAITSTART is activated, ending the procedure.

If the CE1ENT flag was zero, i.e., if it is the first actuation of CE switch 105, then at 537A, the wait start flag is checked. If it is off, then copy microprocessor 200 goes to step 5B31 as later described. If WAITSTART flag is active, then a case "A" is performed beginning with step 537C which resets the flag NOOSUP in the working store 201. The start switch is checked at 537F. If it was actuated at this time, then at 5384, CPYCTR register of working store 201 is made equal to CPYSLCT register of working store 201, which is a memorization step for memorizing the entry from keyboard 91. (If it was not actuated, then any entry from keyboard 91 need not be entered into copy production machine 10 control 53.) If it was actuated, at 5384 CPYCTR register of working store 201 is made equal to the numerical contents of CPYSLCT. Then, at 538A, NEWSLCT is set to one indicating a new selection from keyboard 91 has been made and the output is to be displayed in digits 100, 101. At the step 5396, copy microprocessor 200 checks to see whether or not the brush (not shown) of cleaner station 30 is being adjusted as previously described. The adjustment must be completed before other actions are permitted. If not, SLCTTM is made equal to zero for disabling further selection by the maintenance personnel through panel 52. Then, at 53A1, the stop button 93 is checked and it is determined whether or not it is the mode for supplying signals from copy production machine 10 to control 53. If it is the input mode, then CPYSLCT is set to zero at 53AA in preparation for displaying the value of the inputs. Then, at 53B1, search and display flags are checked. If they are one, then the "B" procedures beginning with 53B1 are performed. Otherwise, the step at 5427 is executed by copy microprocessor 200 as later described. Copy microprocessor 200 in step 53B1 checks the STOP2 bit of working store 201 as well as NEWSLCT. If STOP2 is not set and NEWSLCT is equal to one, then a display operation is initiated at 53BB. The fetched data is checked at 53DA for validity. If it is valid, then the copy microprocessor 200 at 53DE checks whether or not the test mode called for is the output test. If it is an output test, then at 53E4, the test mode value is supplied to an output register (not shown) of control 53 and as shown in Findlay, supra. Then, at 53EB, copy microprocessor 200 checks whether or not the code supplied to the output register requires an adjustment of cleaner station 30. If so, the BRSHACTV flag is reset at 53ED, as is the SLCTTM flag, for disabling parameter selections through panel 52. Then, as 53F8, the CPYCTR and CPYSLCT registers are set to 1XX wherein the X's represent the address of the controlled element of copy production machine 10 to be turned on by actuation of the start button. The one in the leftmost digit position indicates the control device is turned on. Then, at 5412, the "B" procedure flag is set, and at 5418, NOOSUP is set.

If, at 53DE, the output test was zero, i.e., it is an input test, then the emitter wheel 46 is enabled to be sensed by control 53 at 5400. The input value is then displayed by step 5406. The input value is displayed in digit position 102 of the three digit display. The emitter status is restored at 540E. Then, step 5412, as previously described, is executed.

If the code fetched by copy microprocessor 200 from memory 201 at 53BB was found not to be valid at 53DA, then the "A" flag is set at 541F for executing the procedures beginning with 537C. Following setting "A," copy microprocessor 200 at 542D again checks for an output test. If it is not an output test, then the procedure is terminated. If it is an output test, then the device being controlled is turned off at 5433 by setting CPYCTR and CPYSLCT registers to 0XX wherein the X's represent the address of the device being controlled in copy production machine 10. Then, at 5438, copy microprocessor 200 again fetches the code from working store 201. Validity of the fetched code is checked at 5446. If it is a valid code, then the output register referred to above is actuated to turn the device off at 5449. If it is an invalid code, it is ignored and the "A" procedure is set at 5453. It should be appreciated that the code fetched at 538A and 5438 are codes entered via keyboard 91 and stored in working store 201 using known techniques.

Figure 13:
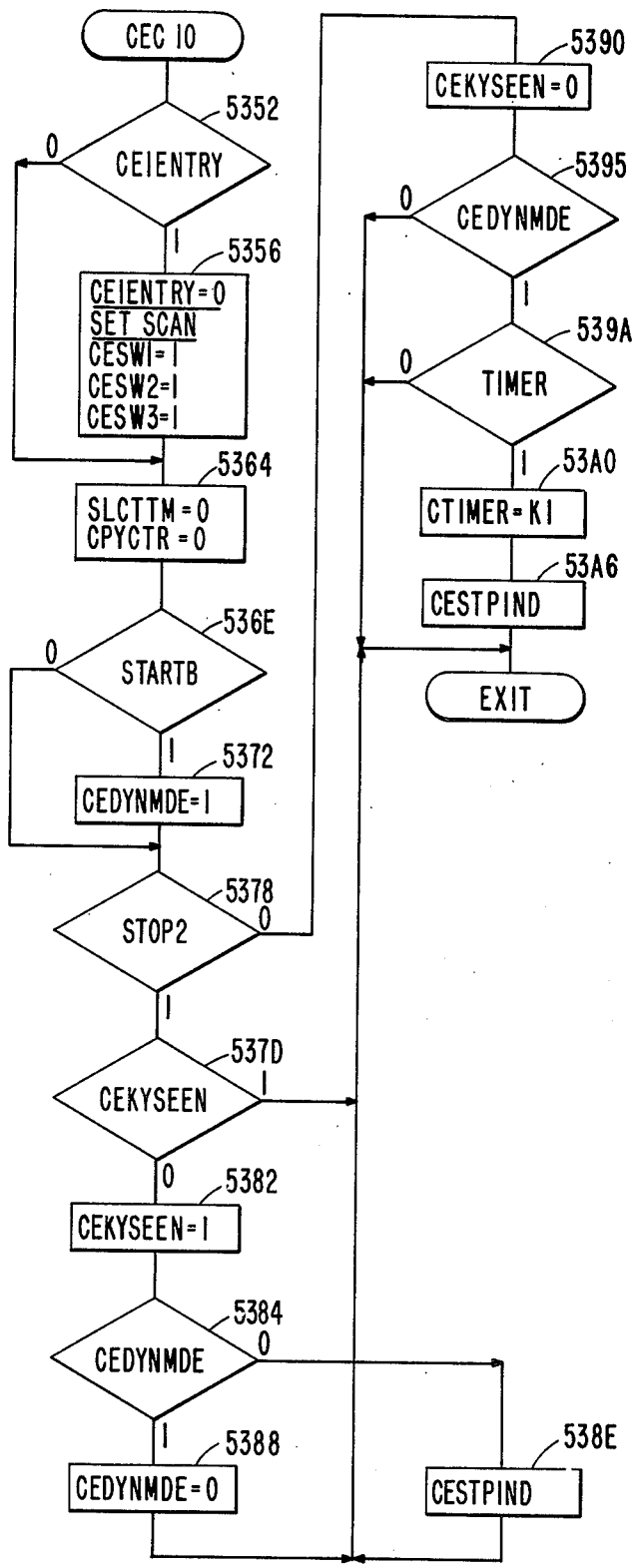
FIG. 13 is a flowchart which illustrates entry into indicator test of the present invention.

FIGS. 13 and 14 illustrate operation of the lamp test mode. FIG. 13 shows CEC10 procedures which include, as will become apparent, the FIG. 14 illustrates procedures. Copy microprocessor 200 checks whether or not it is the first actuation of CE switch 105 at step 5352. If it had been set, i.e., if it is the second actuation, then, at 5356, the flag is reset to zero, a scan is set for scanning the control of the indicators of panel 52, and the three control switches, which control the status of illumination of the lamps identified as CESW1, CESW2 and CESW3, are set.

At 5364, further selection via panel 52 is inhibited and the value of CPYCTR is set to zero. Note that the SLCTTM being reset does not disable the stop switch which is used for changing the control 53 from a continuous scan mode to a step mode as described earlier with respect to FIG. 1.

Actuation of the start button 92 for initiating the scanning of the indicators is checked at 536E. If it has been actuated, then the dynamic mode for first illuminating all indicators and then illuminating each of the indicators sequentially is set at 5372 by setting flag CEDYNMDE within working store 201. To determine whether or not the automatic scan should continue, the actuation of the stop button is checked at 5378. If the stop button was not actuated, then at 5390, flag CEKYSEEN is reset to zero. Then, the flag CEDYNMDE is checked at 5395. If it is active, then the automatic scan is being performed and the status of a timer is checked at 539A. The timer consists of a count field periodically incremented to time how long the lamps should be turned on and off for providing a blinking display. If it has timed out, then the timer is set to a value of K1 at 53A0 for decrementing to zero and the subroutine CESTPIND, flowcharted in FIG. 14, is performed at 53A6 for stepping the indicators as previously described and as illustrated in FIG. 1.

If the stop button had been actuated, as detected by step 5378, then the step mode is entered. At 537D, the CEKYSEEN flag is checked. If it is set to the active condition, then the stop button had already been analyzed and further action in CEC10 procedures is not required. If the flag was reset, then this pass through the CEC10 procedures is the first time the stop button had been activated. Therefore, at 5382, the flag CEKYSEEN is set. Then the flag CEDYNMDE, representing the automatic scan, is checked at 5384. If it is zero, then the CESTPIND subroutine is executed as indicated by the step 538E. Otherwise, the CEDYNMDE flag is reset at 5388, deactivating the automatic stepping and enabling manual stepping by the actuation of the stop switch 93.

The actual stepping indication procedure of FIG. 14 includes sensing the flag CESW1 at 5A53. If it is a one, it is reset at 5A58. A table pointer is set at 5A5A for fetching the address of the output register for controlling the next lamp or indicator to be illuminated. After the pointer, i.e., address, has been calculated, then the address is used to fetch the code 5A64. The indicator is then turned on by sending the appropriate binary one signal to the appropriate output register (not shown) at step 5A67. The above two steps are repeated at 5A6A and 5A6D until all the indicators of panel 52 are on at 5A70. That is, copy microprocessor 200 turns the indicators on one at a time so fast that it appears that the indicators come on simultaneously. Then, at 5A7C, the timer for allowing all of the indicators to be on is set to FF and the procedure terminated. If CESW1 is reset, this indicates that the previous execution of the above-described procedures had turned on all of the panel 52 indicators. Then, at 5A86, the status of CESW2 is checked. If it is one, the flag is reset at 5A8B and, in steps 5A8D, 5AA4, and 5AA7, all of the indicators are turned off.

If both CESW1 and CESW2 are off, then one of the indicators must be turned on and one turned off. If CESW3 is set then the first indicator is turned on with no indicators turned off and the procedure is exited. Since CESW3 is reset at 5AC4, subsequent execution of the CESTPIND subroutine (FIG. 14) causes copy microprocessor 200 to scan the indicators on and then off, using the abovementioned timer at step 5AD8. After the scan has been completed once, the three flags CESW1, CESW2, CESW3 are set to one for repeating the above-described procedures. If should be noted that the combination of the programs of FIGS. 13 and 14 allow the timer 539A and 53A0 to repeat the on/off control of the indicators while the step procedure executes the CESTPIND subroutine (FIG. 14) only on each actuation of the stop button as detected in step 5378.

In addition to all of the above, control 53 allows separate actuation of the various independent parts of copy production machine 10. For example, SADF 11 (FIG. 1) can be operated as a unit independent from the rest of the machine as can the collators 14B, 14C. Additionally, the copy sheet pickers represented by numerals 111, 112 and 113 can also be independently actuated. For purposes of illustration, actuation of SADF 11 by the maintenance personnel using control 53 is illustrated in FIG. 15 through the execution of procedure CEC08. In these procedures, at 51DD, panel 52 selections are inhibited and the value in register CPYSLCT and CPYCTR are set to zero. At 51E9, copy microprocessor 200 checks whether or not an original document is on the platen (not shown) of SADF 11. If a document is on the platen, it is automatically exited at 515F by setting the SADFEXIT flag. Copy microprocessor 200 later senses the flag SADFEXIT and automatically exits the document by actuating motor M via line 150. In this regard, insertion of documents on tray 57 to close pre-entry switch 56 and the actuation of a switch (not shown) on SADF 11 causes the original to be transported to the platen without any action by optics 12.

While the invention has been particularly shown and described with reference to preferred embodiments thereof, it will be understood by those skilled in the art that various changes in form and details may be made therein without departing from the spirit and scope of the invention.

What is claimed is:

1. In a cyclically operable machine, having a control means for cycling the machine through a series of machine cycles and having a plurality of individual control and sensory components, the improvement comprising:
   switching means for selectively switching said machine between an operating mode and a maintenance mode;
   operating means responsive to said control means and to said switching means for operating said individual control components in predetermined sequences during said machine cycles while in the operating mode;

input means responsive to said switching means for supplying input signals to said control means representative of operating parameters when said machine is in said operating mode and representative of separate addresses for selecting separate ones of said individual components when said machine is in said maintenance mode; and means for exercising in said maintenance mode said individual control components, said exercising means including means coupled to said control means for operating while in the maintenance mode said selected individual control component; whereby each of said individual control components can be selectively operated independently for maintenance purposes.

2. The invention as claimed in claim 1 with said machine also having display means responsive to said control means for providing visual indications and wherein said exercising means further includes means responsive to said input means and to said selected individual sensory component for providing signals to said control means to be displayed;

whereby each of said individual sensory means can be selectively sensed independently for maintenance purposes.

3. The machine set forth in claim 2 further including control panel means having start means and stop means, and means in said operating means responsive to said start means in said maintenance mode to actuate said control means to operate said selected one of said individual control components and further responsive to said stop means to deactuate said control means.

4. The machine set forth in claim 1 wherein said control component is a component for controlling illumination of a display, and means for cycling through a plurality of said display-related control components whereby operation of an operator's control panel can be rapidly diagnosed.

5. The machine set forth in claim 1 further including an operator's control panel having a plurality of indicators and a keyboard means as part of said input means for providing said input signals, and means in said control means responsive to said keyboard during said maintenance mode for addressing said individual components.

6. The machine set forth in claim 4 further including means in said control means responsive to said input means and to said selected sensory component for supplying the address of said selected sensory component to said plurality of indicators whereby identification of the component and its actuation state is simultaneously displayed on an operator's control panel.

7. The machine set forth in claim 5 further including a start button and a stop button for starting and stopping respectively said machine while in said operating mode, and means in said control means operative during said maintenance mode and responsive to said start and stop buttons to actuate and to deactuate respectively said selected control component while said machine is in said maintenance mode.

8. The machine set forth in claim 5 further including a digital display on said control panel, means in said control means responsive to said input means for displaying on said digital display means the address of said selected individual component from the keyboard, and means for actuating said digital display to indicate an actuation state of said selected individual component detected by said control means on said display means together with said address.

9. The machine set forth in claim 5 further including means in said control means for verifying validity of an address supplied by said keyboard and means for flashing a signal for indicating to the operator an invalid keyboard entry upon detecting an invalid address.

10. A method of operating a computer controlled cyclical machine having a plurality of controlled components and a plurality of sensory components, all of said components being connected to an automatic control, means for switching between a maintenance mode and an operating mode and an input keyboard, comprising the steps of:

switching to the maintenance mode in said machine;

activating said keyboard to address one of said components;

memorizing said address in an electronic register;

selecting said addressed component; and operating said selected component when said selected component is a controlled component to the exclusion of other ones of said components.

11. The method set forth in claim 10 further including automatically visually displaying the address of said selected component and the activation state thereof.

12. The method set forth in claim 11, wherein said component is a control component, and further including the steps of:

indicating the actuation state of such control component on said display adjacent to said address display, and sequentially activating or deactivating the addressed control component whereby the display and the actual activation state of said control component can be viewed.

13. The method set forth in claim 10 further including the steps of scanning automatically the plurality of said components and activating ad seriatum individual ones of said components to the exclusion of the remaining components.

14. The method set forth in claim 13 further including the step of interleaving activating all of said controlled components simultaneously between predetermined ones of said scans.

15. The method set forth in claim 10 wherein said selected component is a sensory component, and further including the steps of:

sensing the sensory component and displaying the sensed activation state of said sensory component with its address whereby actuation and deactuation of such sensory component can be verified.

16. In a copy production machine having an image input means, a copy production means, a copy output means and a copy sheet transport path means extending between said copy production means and said copy output means for transporting copy sheets therebetween, a source of copy material for supplying copy sheets to said transport path to receive images in said copy production means, a plurality of control elements for operating said machine and a plurality of sensory elements for indicating conditions of said machine, the improvement comprising, in combination:

programmable processor means for executing a stored program having input register means for receiving signals from said sensory components representative of machine conditions and output register means for receiving from said processor means signals generated in accordance with execution of said stored program for actuating said control components;

control panel means coupled to said input register means and said output register means having a plurality of manually actuated switches and visual indicators for enabling operator interaction with said processor for operating said copy production machine by exchange of panel signals therewith;

means responsive to said control panel means for selecting a maintenance mode including means for selecting an individual one of said elements; and means for operating said selected one of said elements to the exclusion of other elements including means for indicating the operative relationship between such individual element and said computer.

17. The machine set forth in claim 16 further including:

selection means responsive to signals from said switches in said control panel means for selecting whether a sensory element or a control element is to be individually addressed, and means responsive to said selection means for accepting a second entry of signals from said switches in said control panel means as the address of a selected element.

18. The machine set forth in claim 17 further including:

means responsive to actuation of a first particular switch on said control panel means to activate a selected control element, and further responsive to actuation of a second particular switch on said control panel means to deactivate said selected control element, and means for displaying the address of said selected control element with its activation or deactivation state.

19. The machine set forth in claim 17 further including means for enabling said processor during said maintenance mode to address a sensory element, and means for continually sensing the activation state of an addressed sensory element;

means for displaying the activation state and the address of said addressed sensory element whereby the actuation of sensory elements can be verified.

20. The machine set forth in claim 17 further including means responsive to a third particular switch in said control panel means for sequentially addressing successive ones of said plurality of said control elements and means responsive to said sequential addressing means for individually actuating addressed control elements.

* * * * *